US005774728A

United States Patent [19]
Breslau et al.

[11] Patent Number: 5,774,728
[45] Date of Patent: Jun. 30, 1998

[54] METHOD AND SYSTEM FOR COMPILING SECTIONS OF A COMPUTER PROGRAM FOR MULTIPLE EXECUTION ENVIRONMENTS

[75] Inventors: Franklin Charles Breslau, Teaneck, N.J.; Paul Gregory Greenstein, Croton-On-Hudson; John Ted Rodell, Wappingers Falls, both of N.Y.

[73] Assignee: International Business Machines Corporation, Armonk, N.Y.

[21] Appl. No.: 579,459

[22] Filed: Dec. 27, 1995

[51] Int. Cl.⁶ ........................................................ G06F 9/45
[52] U.S. Cl. ............................................................. 395/706
[58] Field of Search .................................. 395/705, 706, 395/500

[56] References Cited

U.S. PATENT DOCUMENTS 4,885,684  12/1989  Austin et al. ........................... 395/706
5,313,635  5/1994  Ishizuka et al. ........................ 395/700
5,381,534  1/1995  Shi ........................................... 395/706
5,410,696  4/1995  Seki et al. ............................... 395/706
5,450,567  9/1995  Mori et al. .............................. 395/500
5,452,461  9/1995  Umekita et al. ........................ 395/706
5,535,393  7/1996  Reeve et al. ............................ 395/706

*Primary Examiner*—Emanuel Todd Voeltz
*Assistant Examiner*—Peter J. Corcoran, III
*Attorney, Agent, or Firm*—Edward H. Duffield, Esq.; Heslin & Rothenberg, P.C.

[57] ABSTRACT

In a computer system, a computer program is provided having multiple sections. First and second sections of the computer program correspond to different execution environments. Each of the first section and second section is automatically compiled for its corresponding execution environment. Further, the multiple sections of the computer program may call each other via intra-program type procedure calls. These intra-program type procedure calls are automatically translated into inter-execution environment type procedure calls, between the sections, for their respective execution environments.

42 Claims, 5 Drawing Sheets

METHOD AND SYSTEM FOR COMPILING SECTIONS OF A COMPUTER PROGRAM FOR MULTIPLE EXECUTION ENVIRONMENTS

TECHNICAL FIELD

The present invention pertains in general to compilers. More specifically, the present invention is directed to a method and system for compiling sections of a computer program to multiple execution environments, and is particularly useful in developing client-server computer applications and other applications intended for heterogeneous execution environments.

BACKGROUND OF THE INVENTION

Client-server and distributed computing techniques have gained widespread industry use in connection with computer applications. In distributed computing environments, parts of a single application program execute as separate programs on different computers. The client-server computing environment is one in which portions (e.g., procedures) of an application program execute on one computer and are considered "server" portions, while other portions execute on another computer and are considered "client" portions. The client portions call upon the server portions to accomplish specific tasks. The determination of which computer functions as a client, and which computer functions as a server varies with each function performed, such that a single computer may act as a server for some functions and as a client for others.

The conventional programming methodology used for constructing client and server procedures of a computer program is to separately create such procedures for their respective execution environments. For example, a server procedure intended for execution within a mainframe execution environment would be written and compiled for the mainframe execution environment. Similarly, for example, a client procedure intended for execution within a personal computer execution environment would be written and compiled for the personal computer execution environment. Separate source code files are therefore created for each of the server and client procedures. Tracking and maintaining such separate source code files becomes more difficult as the number of procedures and execution environments involved in the client-server application program under development increases.

Further, as the number of separate source files and execution environments increases, the task of coordinating the use of proper communications library functions to affect communications between client-server procedures becomes complex.

The present invention is directed toward solutions to the above noted-problems.

DISCLOSURE OF THE INVENTION

In a first aspect, the present invention includes a method of compiling a source code version ("source code") of a computer program in a computer system. The method includes providing to the computer system, the source code which include multiple sections. A first section and a second section of the source code are each delimited by a section identifier. The section identifiers indicate an execution environment of their corresponding sections. The method further includes automatically compiling the first section and the second section for their corresponding execution environments using their section identifiers. The first and second sections may correspond to different execution environments which may each have a different processor and/or operating system.

As an enhancement, the method may include processing the source code to create separate target versions thereof. Each target version corresponds to one of the execution environments and includes at least one section of the source code corresponding to the execution environment. The separate target versions may be created using a pre-processor.

Each target version may be compiled with a compiler corresponding to the execution environment thereof. In one embodiment, each target version may be compiled with a selectable target compiler that is informed of the execution environment of the target version. Informing the selectable target compiler of the execution environment may be performed by placing a compiler directive in each target version that specifies the execution environment of the target version. The compiler directive is readable by the selectable target compiler and thereby facilitates the compiling of each target version for its corresponding execution environment.

As a further enhancement, the source code may include a part common to each section, and the method may further include placing the part in each target version. Further, multiple sections of the source code may correspond to one execution environment. The method may then include placing the multiple sections corresponding to the one execution environment in the target version corresponding to the one execution environment. In an embodiment where one section of the source code corresponds to multiple execution environments, the method may include placing the one section in each target version corresponding to each of the multiple execution environments of the one section.

As yet another enhancement, the compiling may be performed on a selectable target compiler operating in multiple passes. Each pass of the multiple passes corresponds to a different execution environment. Further, for each pass, all sections corresponding to the execution environment of that pass may be compiled. If the source code includes a part common to each section, it is also compiled during each pass.

In another aspect, the present invention includes a method of modifying a source code version of a computer program ("source code") in a computer system to support inter-execution environment procedure calls. The method includes providing the source code to the computer system. The source code includes a first section and a second section, wherein each of the first section and the second section correspond to an execution environment. Further, the first section includes a calling procedure, and the second section includes a called procedure, wherein the calling procedure calls for the execution of the called procedure using an intra-program type procedure call. The method further includes automatically translating the intra-program type procedure call into an inter-execution environment type procedure call from the calling procedure in its corresponding execution environment to the called procedure in its corresponding execution environment.

As an enhancement, the first section may correspond to a first execution environment, and the second section may correspond to a second execution environment, wherein the first execution environment is different from the second execution environment.

As yet another enhancement, the translating may include automatically inserting communications-type source code statements into the source code to facilitate the inter-execution environment type procedure call. Specifically communications-type source code statements may be automatically inserted into the calling and called procedures which initialize variables used by the inter-execution environment type procedure call. Also, communication related source code statements may be automatically inserted into the called procedure which inform a communications subsystem of the called procedure.

Corresponding systems to the methods discussed herein are also disclosed.

The present invention has several advantages and features associated with it. The techniques disclosed herein simplify the authoring of programs that have sections which execute within different execution environments. Such simplification is enabled by permitting the different sections to be included within a single source code file. Thus, a programmer need not edit and maintain multiple files on multiple computer systems to create a program that has portions executing within different execution environments. As one example, client-server type application programs typically contain procedures (i.e., sections) that execute on different execution environments. Authoring of client-server application programs is simplified by the techniques disclosed herein by enabling different client and server procedures to be contained within one source code file, regardless of their intended execution environment.

Further advantages of the present invention arise from the automatic insertion of communications commands into the source code to enable communications between procedures. The manual creation and maintenance of communications program statements and parameters used to support communications between different procedures is obviated by the techniques disclosed herein. The creation of computer programs having communicating procedures in different execution environments is therefore simplified.

BRIEF DESCRIPTION OF THE DRAWINGS

The subject matter regarded as the present invention is particularly pointed out and distinctly claimed in the concluding portion of the specification. The invention, however, both as to organization and method of practice, together with further objects and advantages thereof, may best be understood by reference to the following detailed description taken in conjunction with the accompanying drawings in which:

DETAILED DESCRIPTION OF A PREFERRED EMBODIMENT

According to the techniques of the present invention, the source code of a computer program is presented to a computer system. Within the source code are multiple sections, wherein at least two of the sections are intended for different execution environments. The techniques disclosed herein facilitate compiling the different sections for their respective execution environments. For example, in a client-server computing system, a single source code file may include sections (e.g., each section having one or more procedures) intended for different execution environments. Specifically, e.g., a database related procedure may be desirably compiled for, and executed within, a mainframe execution environment that contains the database; and a graphics related procedure may be desirably compiled for, and executed within, a personal computer execution environment that includes graphics facilities. The techniques disclosed herein enable the above-summarized compilation for different execution environments.

As used herein, the term "execution environment" is defined as the combination of hardware and software that supports an executing program. A program will only properly execute within a specific execution environment if it is compiled for that execution environment. As examples, different execution environments include, e.g., an International Business Machines Corp. ("IBM") mainframe computer executing a Multiple Virtual Storage ("MVS") operating system, an IBM mainframe computer executing a Virtual Machine ("VM") operating system, an "INTEL" processor based personal computer executing an "IBM OS/2 Warp" operating system, an "INTEL" processor based personal computer executing a "MICROSOFT WINDOWS 95" operating system, and a "POWER PC" based computer executing a "UNIX" operating system. One of ordinary skill in the art will understand that, for a computer program to run in a native mode (i.e., no-emulation), within a given execution environment, the program must be specifically compiled for that execution environment.

Figure 5:
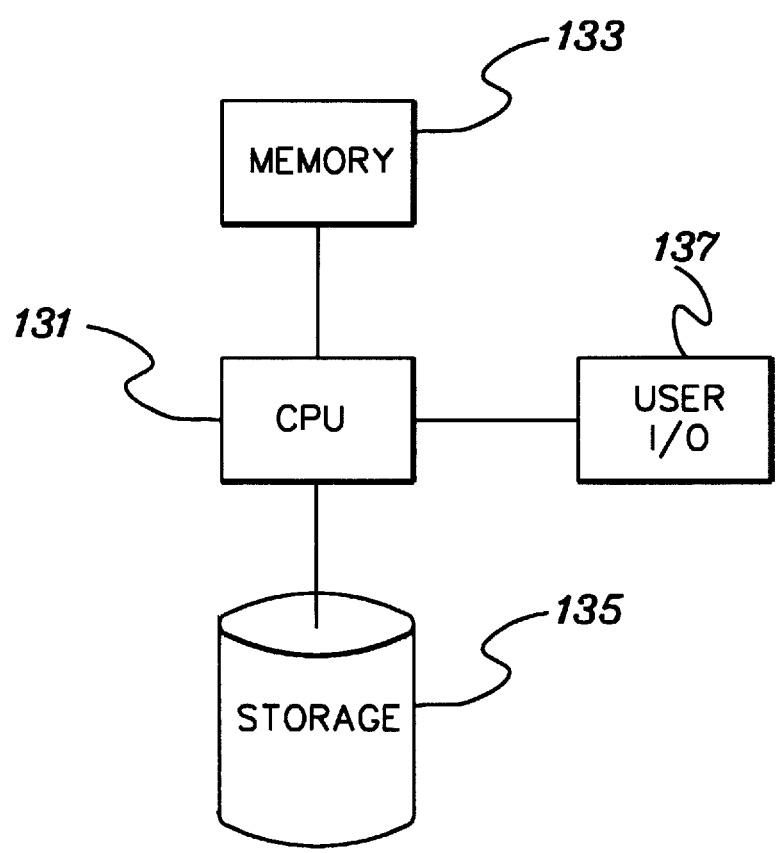
FIG. 5 is a diagram of one example of a system useful in implementing embodiments of the present invention.

One example of the hardware elements of a computer system used to implement the techniques of the present invention are shown in FIG. 5. A central processing unit ("CPU") 131 provides main processing functionality. A memory 133 is coupled to CPU 131 for providing operational storage of programs and data. Memory 133 may by, for example, random access memory ("RAM") or read only memory ("ROM"). Non-volatile storage of, for example, data files and programs is provided by a storage 135 that may be, for example, disk storage. Both memory 133 and storage 135 are computer usable media that may store computer program products as computer readable program code. User input and output are provided by a user input/output ("I/O") facility 137. User I/O facility 137 may include, for example, a graphical display, a mouse and/or a graphics tablet. As an example, the system of FIG. 5 may be an "ES/9000 Mainframe Computer System" executing a "MVS" ("Multiple Virtual Storage") operating system from "IBM CORP."

Figure 1:
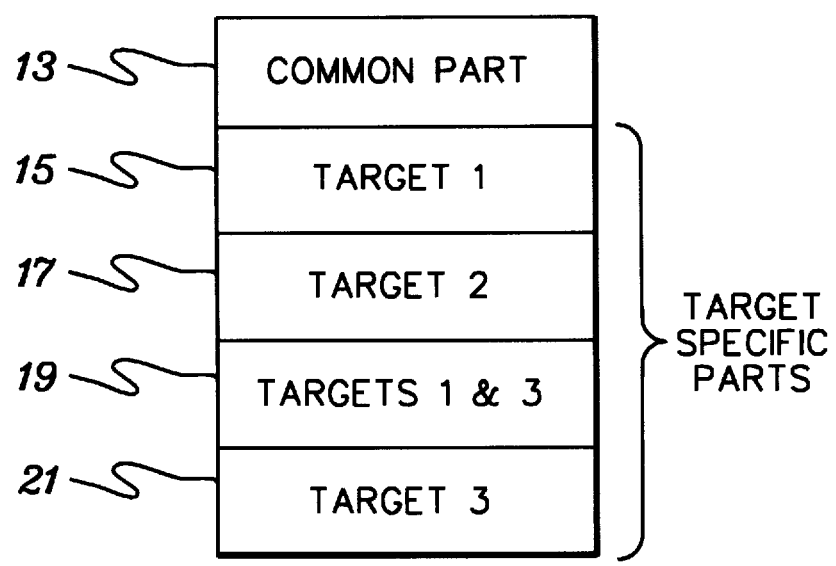
FIG. 1 is an outline of one example of the source code of a computer program having multiple sections pursuant to an embodiment of the present invention.

An outline of an example computer program source code 11 ("source code"), having different sections intended for different execution environments (i.e., execution environment specific sections) is shown in FIG. 1. One section of source code 11 is a common part 13 used by one or more of the execution environment specific sections (programs may not always include common part 13). Common part 13 may contain, e.g., common subroutines, variable and constant definitions, internal program documentation (e.g., comments), include file and header file references, and any other computer program source code information useful to one or more of the execution environment specific sections of source code 11. The execution environment specific sections of source code 11 include, e.g., a section 15 intended for target 1 (i.e., target execution environment 1), a section 17 intended for target 2, a section 19 intended for targets 1 & 3, and a section 21 intended for target 3.

A more specific example of the source code 11 (i.e., in hypothetical programming language form) of FIG. 1 is shown below:

@TARGET DEFINE(1, MVS, IBM390); /* Execution environment 1 is an "IBM SYSTEM/390" class Mainframe computer executing an "MVS" operating system */

@TARGET DEFINE(2, UNIX, PPC); /* Execution environment 2 is a "POWER PC" processor based computer executing a "UNIX" operating system */

@TARGET DEFINE(3, OS2, INT); /* Execution environment 3 is an "INTEL" processor based computer executing an "IBM OS/2 WARP" operating system */ /* These are comments common to all sections of the program. */

INCLUDE<FILE_METHODS>/* File routines common to all sections of the program */

ACCESS_CODE=ABD0 /* Common variable definition */

@TARGET START(1); /* Begin target 1 section */ SERVER1: PROC; /* Server portion of the program */ END SERVER1;

@TARGET END(1); /* End target 1 section */

@TARGET START(2) /* Begin target 2 section */ CLIENT1: PROC(P1);/* Client 1 portion of the program */ END CLIENT1;

@TARGET END(2); /* End target 2 section */

@TARGET START(1,3); /* Begin target 1&3 section */CLIENT1_3: PROC(DATA);/* multiple client portion of the program */ END CLIENT1_3;

@TARGET END(1,3); /* End target 1&3 section */

@TARGET START(3); /* Begin target 3 section */ CLIENT3: PROC(FILENAME); /* client 3 portion of the program */ END CLIENT3;

@TARGET END(3); /* End target 3 section */

As shown in the above source code example, each target execution environment is defined using the following directive:

@TARGET DEFINE(<target_name>, <operating_system>, <processor>)

target_name—An identifier used to identify the execution environment (e.g., alpha and/or numeric).

operating_system—The operating system of the execution environment.

processor—The type of processor used in the execution environment.

Based upon the definition of execution environments using the "DEFINE" directive, reference may be made to these execution environments in association with delimited sections of the source code. These delimited sections will be compiled for their specified execution environments. As an enhancement, the compiler could generate an "eye-catcher" in the object code of each section to facilitate debugging. The "eye-catcher" could include, e.g., the source code filename and compilation time/date, and is generatable using conventionally available compiler options.

One example of the delimiters used to identify a section of the source code with a particular execution environment is:

@TARGET START(<target_name>|,<additional_target$_{13}$ name>|); . . . source code section . . .

@TARGET END(<target_name>|,<additional_target_Name>|);

target_name—An identifier used to refer to a defined execution environment.

additional_target_name—Optional additional execution environment(s) that the section of source code is targeted for.

The "@TARGET END" function is also attained upon detection of the end of a program source, which automatically signals the closure of any outstanding "@TARGET STARTS".

According to the techniques disclosed herein, a particular section of source code may be targeted for multiple execution environments. This is implemented through the inclusion of one or more "additional_target_name" parameters. As an example, the "CLIENT1_3" section of source code in the above example is intended for execution environment 1 (e.g., an "IBM" mainframe computer operating under "MVS") and execution environment 3 (e.g., and "INTEL" processor based personal computer operating under "OS/2 WARP"). Furthermore, multiple sections of the source code may be directed to the same execution environment. For example, the "CLIENT1" section and the "CLIENT1_3" section of the source code of the above example are both directed to execution environment 1 (e.g., an "IBM" mainframe computer operating under "MVS").

According to the techniques disclosed herein, identified program sections may overlap. This overlapping may be used to cause, e.g., multiple program sections to be complied for multiple execution environments. For example, in the below code segments, code portions A and B are compiled for target environment 1, and code portions B and C are compiled for target environment 2.

@TARGET START (1);
//CODE PORTION A//
@TARGET START (2);
//CODE PORTION B//
@TARGET END (1);
//CODE PORTION C//
TARGET END (2);

Code sections may also be nested in a similar manner.

It will be understood by one of ordinary skill in the art that the particular format of the delimiters and directives described herein are only examples, and that variations thereto are to be considered part of the invention claimed herein.

Figure 2:
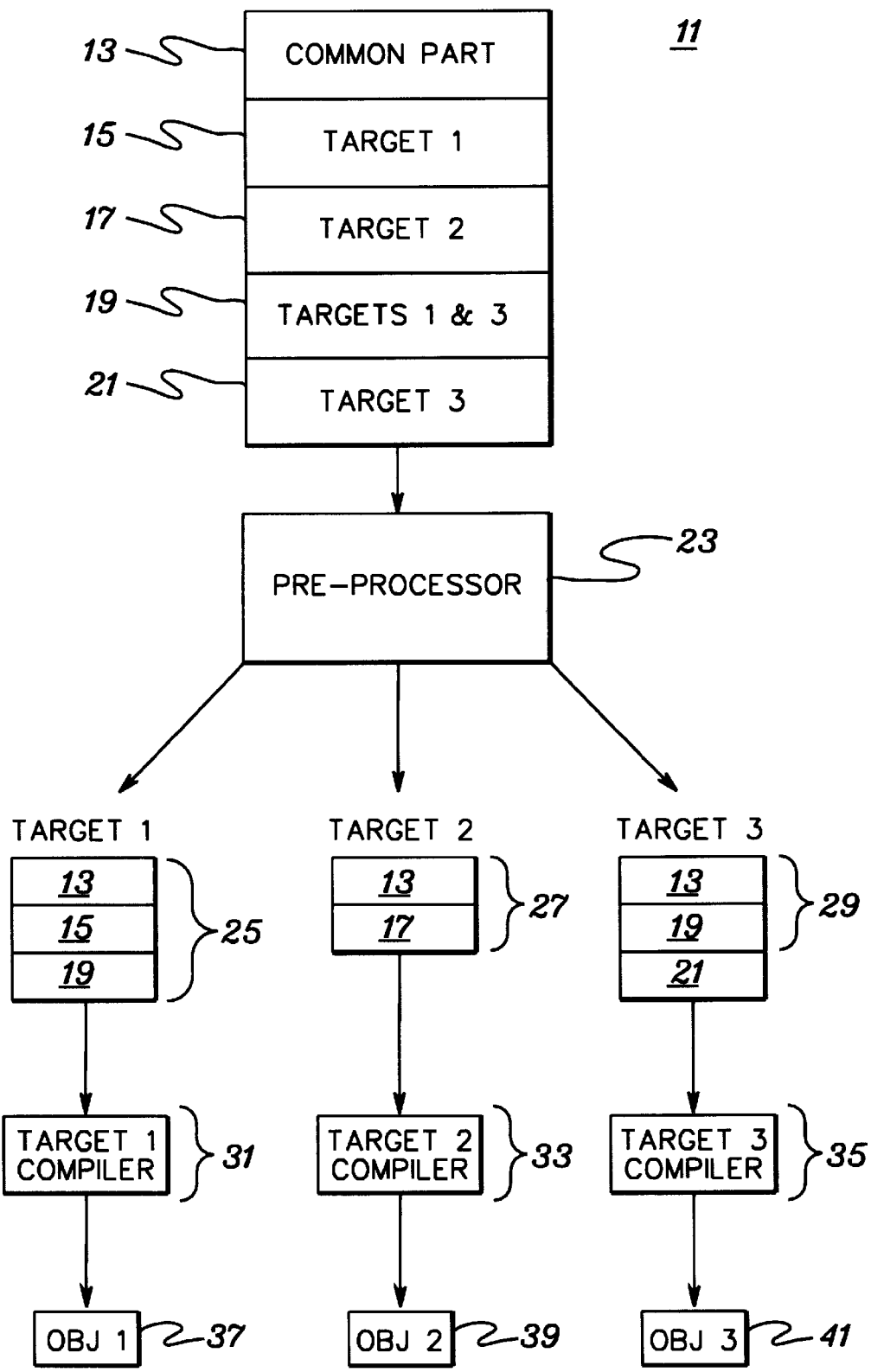
FIG. 2 is a diagram of one example of the processing of the source code of FIG. 1 according to one embodiment of the present invention.

One example of a processing flow for compiling sections of a source code to corresponding execution environments, according to one embodiment of the present invention, is shown in FIG. 2. As discussed hereinabove with reference to FIG. 1, source code 11 contains common part 13 and multiple sections 15, 17, 19 and 21. Source code 11 is directed to a pre-processor 23 which is responsible for parsing source code 11 and appropriately creating target versions of source code 11 for each execution environment. Specifically, a target version 1 (25), a target version 2 (27) and a target version 3 (29) are created. Target version 1 (25) includes common part 13 of source code 11 and sections 15 and 19 of source code 11 intended for execution environment 1. Target version 2 (27) includes common part 13 of source code 11 and section 17 of source code 11 intended for execution environment 2. Target version 3 (29) includes common part 13 of source code 11 and sections 19 and 21 of source code 11 intended for execution environment 3. One example of the steps employed by preprocessor 23 to accomplish the above is described further below with respect to FIG. 3.

After each target version is created, it may be compiled for its intended execution environment. In the example embodiment of the present invention shown in FIG. 2, each target version (25, 27 & 29) is directed to a target compiler (31, 33 & 35) that corresponds to the target version's intended execution environment. As a result of compilation, object files (37, 39 & 41) are created. Each object file (37, 39 & 41) corresponds to an execution environment intended for the target version from which it was compiled. These object files may then be distributed to their respective execution environments for linking and execution using conventional processing.

Many variations of the above described techniques are possible, and all such variations are to be considered part of the invention as claimed. For example, target versions (25, 27 & 29) of source code 11 may be transferred to their respective execution environments, and then compiled therein. Alternatively, a single, selectable target compiler (e.g., "VisualAge C++"" from "IBM CORP." or Microfocus COBOL) may be used to compile each target version (25, 27 & 29) of source code 11. The selectable target compiler is informed (e.g., by a header within each target version that is generated by pre-processor 23) which execution environment to generate object code for. As a further variation, e.g., the logic of pre-processor 23 may be built into a selectable target compiler thereby obviating the need for a separate pre-processor. Other variations are possible and will be apparent to one of ordinary skill in the art in view of this disclosure.

Figure 3:
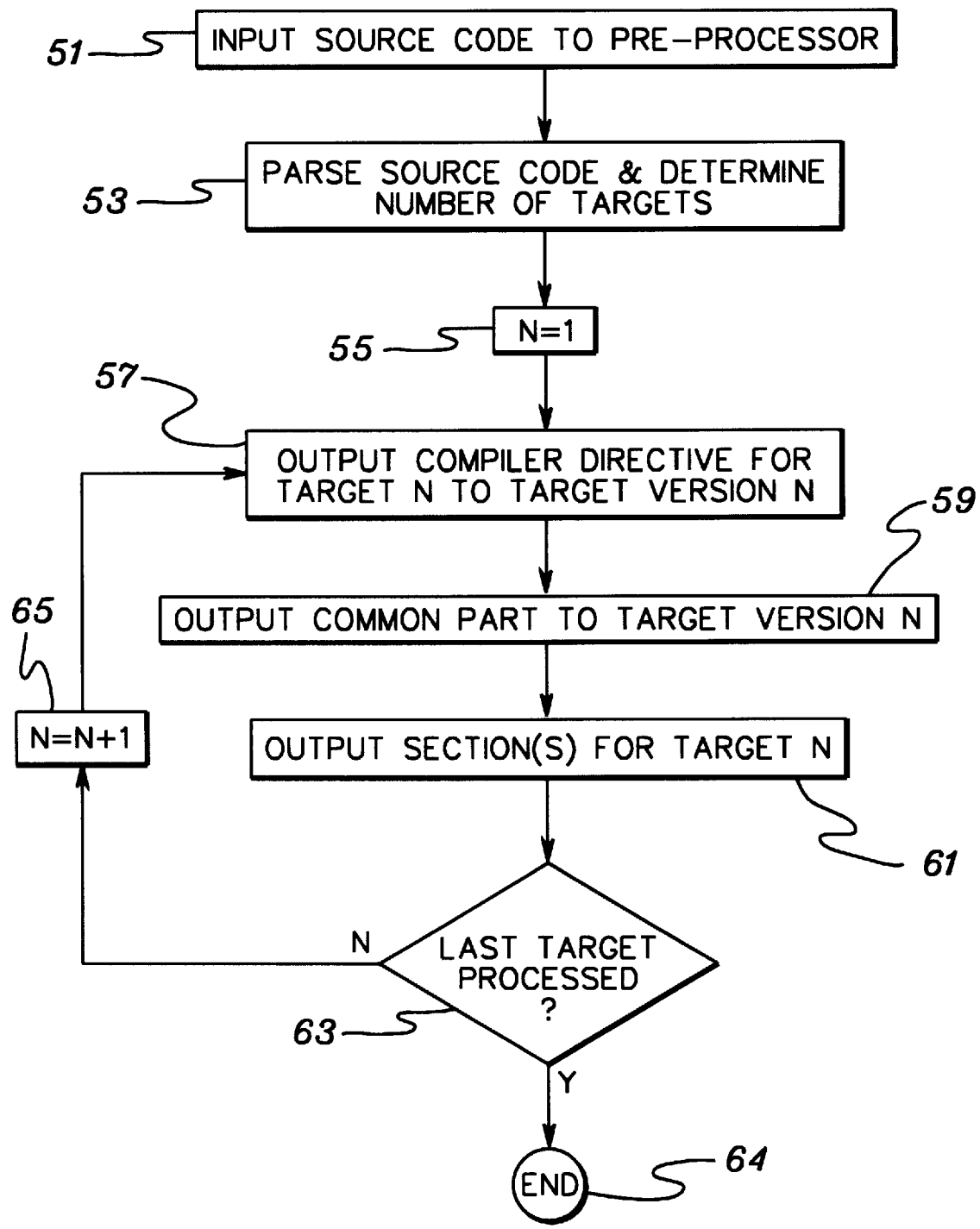
FIG. 3 is a flow-diagram of one example of the compiling techniques that use a pre-processor to parse source code in accordance with an embodiment of the present invention.

One example of the steps employed by a pre-processor in accordance with one embodiment of the present invention is shown in the flow-diagram of FIG. 3. The pre-processor itself is a software component whose particular implementation will be apparent to one of ordinary skill in the art in view of this disclosure. As one example, in "OS/2 WARP" operating system, the pre-processor could be written using the "REXX"(Restructured Extended Execution Language) command language.

A first step in the process shown in FIG. 3 includes the inputting of the source code to the pre-processor, STEP 51. Implementation of this step may vary, and may include, e.g., reading the entire source code into memory, or reading in and processing the source code as the below described processing ensues. The source code is parsed to determine the number of target environments for which compilation is required (e.g., determined from the "@TARGET DEFINE( . . . )" directives discussed hereinabove), STEP 53. The succeeding processing proceeds iteratively, wherein each iteration corresponds to one execution environment. During each iteration, a different target version is created (e.g., target versions 25, 27 & 29 of FIG. 2). A counter variable, N, is used to track these iterations, and is initialized, STEP 55.

To continue, a compiler directive for the current execution environment is output into the current target version, STEP 57. This directive will instruct the compiler (e.g., a selectable target compiler) which execution environment to compile for. If, e.g., a "VisualAge C++" compiler is used, and, e.g., an "INTEL i486" processor, "OS/2 WARP" environment is desired, this compiler directive would be "/G4". As one variation, if dedicated compilers for each execution environment are used (e.g., FIG. 2), this directive would be unnecessary.

The common part of the source code is next output into the current target version, STEP 59. After that, the source code is parsed for sections corresponding to the current execution environment, and each section corresponding thereto is output into the current target version, STEP 61.

A test is next performed to determine if the current iteration completed processing of the last execution environment, INQUIRY 63. If the last execution environment has not been processed, N is incremented, STEP 65, and the process repeats (at STEP 57) for the next execution environment. If the last target version has been processed, then the method of FIG. 3 is complete, STEP 64.

In another embodiment of the present invention, a selectable target compiler is used, and the logic of the pre-processor (described above with respect to FIG. 3) is incorporated into the compiler. Some modification to the steps of FIG. 3 is performed to account for the integration of the pre-processor logic into the compiler. In particular, e.g., instead of outputting a compiler directive into each target version that corresponds to the target execution environment (STEP 57), the compiler is directly set for the current target execution environment. Multiple compilation passes are performed, with each pass corresponding to a different execution environment, and with each pass compiling the program sections corresponding to the execution environment of that pass. Alternatively, a first pass may indicate the number of, and type of different execution environments; while a second pass may include multiple parallel compilation tasks, each compiling sections of the source code for their corresponding execution environment.

The techniques of the present invention are not limited to client-server application programs, but are useful in connection with any application program having sections intended for multiple execution environments. By including each section of application program code in one source code file, the creation and maintenance of the source code is simplified.

In certain application programs which use multiple execution environments, and particularly in client-server application programs, calls are performed between procedures executing within the different execution environments. Several system facilities (e.g., "RPC"—Remote Procedure Call & "APPC"—Advanced Program-to-Program Communication) are available to programmers for implementing such procedure calls.

According to the techniques of the present invention, the writing of computer code to facilitate communications (i.e., calls) between procedures within different execution environments is simplified. This simplification is facilitated by the inclusion of the procedures that call each other within a single source code file. Shown below is an example source code listing having a procedure call between two different execution environments according to the techniques of the present invention.

@TARGET DEFINE(1, UNIX, PPC); /* Execution environment 1 is a "POWER PC" processor based computer executing a "UNIX" operating system */
@TARGET DEFINE(2, OS2, INT); /* Execution environment 2 is an "INTEL" processor based computer executing an "IBM OS/2 WARP" operating system */
@COMM(x,y) PROTOCOL(RPC); /* Informs the compiler that communications will take place between procedure x and procedure y using an RPC protocol */
@TARGET START(1); /* Begin target 1 section */ int x( . . . ); /* define calling procedure */ {int i,j; /* define variables */ . . . j:=y(i); /* intra-program type procedure call */ . . . }
@TARGET END(1); /* End target 1 section */
@TARGET START(2) /* Begin target 2 section */ int y(int i); /* define called procedure */ { . . . /* perform calculation */ return ( . . . ); /* return calculated value */ }

@TARGET END(2); /* End target 2 section */

In the above source code example, a compiler directive ("@COMM") informs the compiler that a procedure call between two execution environments will take place. This directive has the following format:

@COMM(<calling_procedure>,<called_procedure>)
PROTOCOL(<protocol>);
  calling_procedure—name of the procedure that will call a procedure in a different execution environment.
  called_procedure—name of the procedure that will be called from a procedure in a different execution environment.
  protocol—the protocol to be used for the procedure call between execution environments.

Upon encountering this directive, the compiler (or a pre-processor) will amend the source code (i.e., create a temporary modified version of the source code) to include appropriate communications commands to affect the procedure call between the different execution environments. The steps for performing this amendment of the source code are described hereinbelow with respect to the flow-diagram of FIG. 4. In the current embodiment, these steps are performed before the multiple execution environment compilation techniques discussed hereinabove. In an alternate embodiment, the steps shown, e.g., in FIG. 4, could be integrated into the multiple execution environment compilation techniques and could be performed concurrently therewith.

Figure 4:
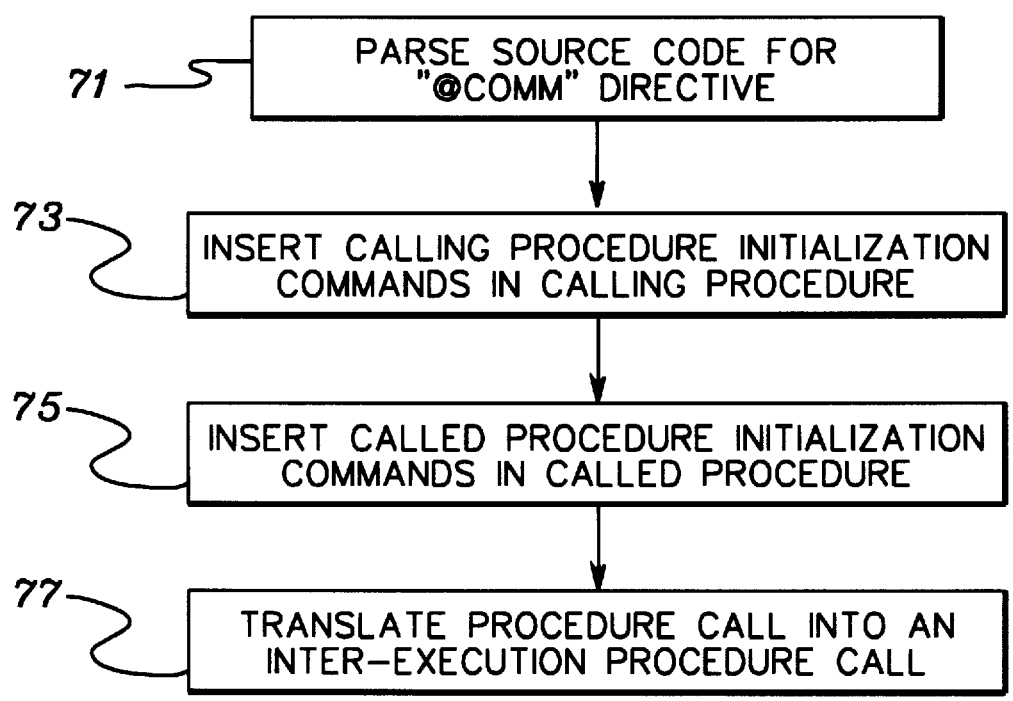
FIG. 4 is a flow-diagram of one example of techniques for automatically inserting communications function calls into source code pursuant to one embodiment of the present invention.

Referring to FIG. 4, as a first step, the source code is scanned for directives (e.g., "@COMM") specifying inter-process communications, STEP 71. In the above source code example, the "COMM" directive indicates that procedure x is calling procedure y using a RPC ("Remote Procedure Call") mechanism. In response to a directive being encountered, appropriate initialization routines for the designated protocols are inserted into the subject procedures. Specifically, initialization code for the calling procedure (e.g., procedure x) to use the specified protocol (e.g., RPC) is inserted into the calling procedure, STEP 73.

More specifically, e.g., if RPC is the selected protocol, and the execution environment is an "INTEL" processor based computer executing an "OS/2 WARP" operating system, the appropriate initialization commands for a calling procedure (e.g., a client) include the definition of parameters used in the actual remote procedure call. The specific parameters used for remote invocation will vary with the particular implementation and execution environment, but will be apparent to one of ordinary skill in the art based upon this disclosure. Information regarding specific details of the use of an "RPC" in an "INTEL" processor based "IBM OS/2 WARP" operating system execution environment may be found in the "IBM TCP/IP for OS/2 Users Guide," IBM Document number SC31-6076-05, which is hereby incorporated herein by reference in its entirety.

Initialization code for the called procedure (e.g., procedure y) using the specified protocol (e.g., "RPC") is inserted into the called procedure, STEP 75. The called procedure is conventionally called a server procedure. In the "OS/2 WARP" execution environment discussed above, this initialization includes the registering of the server procedure with the "TCP/IP" communications stack routines using, e.g., the "registerrpc" command. Initialization commands for a called procedure also include the definition of variables used to support the remote procedure call. Again, specific details of these commands will be apparent to one of ordinary skill in view of this disclosure and may be found in the "IBM OS/2 WARP TCP/IP" documentation incorporated by reference hereinabove.

A further step according to the techniques disclosed herein includes translating the procedure call (e.g., the calling of procedure y by procedure x) into commands for carrying out the procedure call using the designated protocol. As originally written, the procedure call has the form of a conventional intra-program type procedure call. According to the techniques of the present invention, this intra-program type procedure call is translated into an inter-execution environment procedure call. Through the "COMM" and "TARGET" directives, the protocol of the call and particular execution environments of the called and calling procedure is known. As one example, in an "OS/2 WARP" execution environment for a calling procedure, using an "RPC" protocol, the intra-program procedure call is translated into an inter-execution environment procedure call which is implemented using a "callrpc" command. The specific commands for other execution environments will vary based upon the specific protocol used and will be apparent to one of ordinary skill in the art in view of this disclosure.

As an alternative to imbedding all of the source code statements required to support communications using the designated protocol (e.g., "RPC"), another approach may be taken. For example, procedures for each selectable protocol are pre-written, and initialization and remote calling are performed for both the calling and called procedures. Calls to these procedures are inserted into the source code when appropriate, as described above. Particularly, e.g., instead of inserting individual, e.g., "RPC" initialization statements into a calling procedure, a call to a prewritten "RPC" initialization routine is inserted. Similarly, in translating the actual intra-program type procedure call into an inter-execution type procedure call, the name of the called procedure and parameters passed thereto are passed to a prewritten procedure that includes all the code required to affect, e.g., an "RPC". These prewritten procedures may be, e.g., appended to the current source code, or pre-compiled and bound to the source code upon linkage of the complied version thereof.

The method shown in FIG. 4 is therefore completed.

Described above are examples of techniques for compiling programs that have sections targeted for multiple execution environments and for automatically including communications routines therein. It will be apparent to those of ordinary skill in the art that the above-described flows and sequences of steps are only examples. There can be many variations to the above, including, for instance, processing more or less than the steps described above, modifying one or more of the steps, or changing the order of some of the steps without departing from the true spirit and scope of the present invention. These variations are, therefore, considered a part of the claimed invention.

In summary, the present invention has several advantages and features associated with it. The techniques disclosed herein simplify the authoring of programs that have sections which execute within different execution environments. Such simplification is enabled by permitting the different sections to be included within a single source code file. Thus, a programmer need not edit and maintain multiple files on multiple computer systems to create a program that has portions executing within different execution environments. As one example, client-server type application programs typically contain procedures (i.e., sections) that execute on different execution environments. Authoring of client-server application programs is simplified by the techniques disclosed herein by enabling different client and server procedures to be contained within one source code file, regardless of their intended execution environment.

Further advantages of the present invention arise from the automatic insertion of communications commands into the source code to enable communications between procedures. The manual creation and maintenance of communications program statements and parameters used to support communications between different procedures is obviated by the techniques disclosed herein. The creation of computer programs having communicating procedures in different execution environments is therefore simplified.

While the invention has been described in detail herein, in accordance with certain preferred embodiments thereof, many modifications and changes thereto may be affected by those skilled in the art. Accordingly, it is intended by the appended claims to cover all such modifications and changes as fall within the true spirit and scope of the invention.

We claim:

1. A method of compiling a source code version ("source code") of a computer program in a computer system comprising:
    (a) providing to said computer system, said source code, said source code comprising a plurality of sections, a first section and a second section of said plurality of sections each being delimited by a section identifier corresponding to said section, said section identifier indicating an execution environment of its corresponding section; and
    (b) automatically compiling said first section and said second section for their corresponding execution environments using their section identifiers, regardless of whether the execution environments are the same or different.

2. The method of claim 1, wherein said first section and said second section correspond to different execution environments.

3. The method of claim 2, wherein said different execution environments have at least one of different processors and operating systems.

4. The method of claim 1, wherein said method further comprises processing said source code to create separate target versions of said source code, each target version corresponding to one of the execution environments and including at least one section of said source code corresponding to said execution environment.

5. The method of claim 4, wherein said processing comprises processing said source code to create said separate target versions using a pre-processor.

6. The method of claim 4, wherein said compiling comprises compiling each target version with a compiler corresponding to the execution environment of each target version.

7. The method of claim 4, wherein said compiling comprises compiling each target version with a selectable target compiler, said selectable target compiler being informed of the execution environment of each target version to facilitate said compiling of each target version for its corresponding execution environment.

8. The method of claim 7, wherein said method further comprises placing a compiler directive in each target version specifying the execution environment of said target version, said compiler directive being readable by said selectable target compiler to facilitate said compiling of each target version for its corresponding execution environment.

9. The method of claim 4, wherein said source code includes a part common to each section, and wherein said method further comprises placing said part in each target version.

10. The method of claim 4, wherein multiple sections of said plurality of sections of said source code correspond to one execution environment, and wherein said method further includes placing said multiple sections corresponding to said one execution environment in said target version corresponding to said one execution environment.

11. The method of claim 4, wherein one section of said source code corresponds to multiple execution environments, and wherein said method further includes placing said one section in each target version corresponding to each of the multiple execution environments of the one section.

12. The method of claim 1, wherein said compiling is performed on a selectable target compiler.

13. The method of claim 12, wherein said compiling comprises said selectable target compiler processing said source code in multiple passes, each pass of said multiple passes corresponding to a different execution environment.

14. The method of claim 13, wherein for each pass of said multiple passes, all sections corresponding to the execution environment of said pass are compiled.

15. The method of claim 13, wherein said source code includes a part common to each section, and wherein during each pass, said part is compiled.

16. A method of modifying a source code version of a computer program ("source code") in a computer system to support inter-execution environment procedure calls comprising:
    (a) providing to said computer system, said source code, said source code comprising a first section and a second section, each of said first section and said second section corresponding to an execution environment, said first section including a calling procedure, said second section including a called procedure, said calling procedure calling for the execution of the called procedure using an intra-program type procedure call; and
    (b) automatically translating said intra-program type procedure call into an inter-execution environment type procedure call from the calling procedure in its corresponding execution environment to the called procedure in its corresponding execution environment, regardless of whether the execution environment for said first section is the same or different than the execution environment for said second section.

17. The method of claim 16, wherein said first section corresponds to a first execution environment, said second section corresponds to a second execution environment, and wherein said first execution environment is different from said second execution environment.

18. The method of claim 16, wherein said translating includes automatically inserting communications-type source code statements into said source code to facilitate said inter-execution environment type procedure call.

19. The method of claim 18, further comprising automatically inserting communications-type source code statements into the calling procedure and the called procedure which initialize variables used by the inter-execution environment type procedure call.

20. The method of claim 18, further comprising automatically inserting communication related source code statements into the called procedure which inform a communications subsystem of the called procedure.

21. The method of claim 16, wherein said source code comprises a plurality of sections, each section of said plurality of sections corresponding to an execution environment, and wherein said method further comprises automatically compiling each section of said plurality of sections for its corresponding execution environment.

22. A system used to compile a source code version ("source code") of a computer program in a computer system, said system comprising:

means for providing to said computer system, said source code, said source code comprising a plurality of sections, a first section and a second section of said plurality of sections each being delimited by a section identifier corresponding to said section, said section identifier indicating an execution environment of its corresponding section; and means for automatically compiling said first section and said second section for their corresponding execution environments using their section identifiers, regardless of whether the execution environments are the same or different.

23. The system of claim 22, wherein said first section and said second section correspond to different execution environments.

24. The system of claim 23, wherein said different execution environments have at least one of different processors and operating systems.

25. The system of claim 22, wherein said system further comprises means for processing said source code to create separate target versions of said source code, each target version corresponding to one of the execution environments and including at least one section of said source code corresponding to said execution environment.

26. The system of claim 25, wherein said means for processing includes a pre-processor for processing said source code to create said separate target versions.

27. The system of claim 25, wherein said means for compiling comprises means for compiling each target version with a compiler corresponding to the execution environment of each target version.

28. The system of claim 25, wherein said means for compiling comprises means for compiling each target version with a selectable target compiler, said selectable target compiler being informed of the execution environment of each target version to facilitate said compiling of each target version for its corresponding execution environment.

29. The system of claim 28, further comprising means for placing a compiler directive in each target version specifying the execution environment of said target version, said compiler directive being readable by said selectable target compiler to facilitate said compiling of each target version for its corresponding execution environment.

30. The system of claim 25, wherein said source code includes a part common to each section, and wherein said system further comprises means for placing said part in each target version.

31. The system of claim 25, wherein multiple sections of said plurality of sections of said source code correspond to one execution environment, and wherein said system further includes means for placing said multiple sections corresponding to said one execution environment in said target version corresponding to said one execution environment.

32. The system of claim 25, wherein one section of said source code corresponds to multiple execution environments, and wherein said system further includes means for placing said one section in each target version corresponding to each of the multiple execution environments of the one section.

33. The system of claim 22, wherein said means for compiling includes a selectable target compiler.

34. The system of claim 33, wherein said means for compiling comprises means for said selectable target compiler processing said source code in multiple passes, each pass of said multiple passes corresponding to a different execution environment.

35. The system of claim 34, wherein said means for compiling further comprises means for compiling, for each pass of said multiple passes, all sections corresponding to the execution environment of said pass.

36. The system of claim 34, wherein said source code includes a part common to each section, and wherein said means for compiling includes means for compiling, during each pass, said part common to each section.

37. A system used in modifying a source code version of a computer program ("source code") to support inter-execution environment procedure calls in a computer system, said system comprising:

means for providing to said computer system, said source code, said source code comprising a first section and a second section, each of said first section and said second section corresponding to an execution environment, said first section including a calling procedure, said second section including a called procedure, said calling procedure calling for the execution of the called procedure using an intra-program type procedure call; and means for automatically translating said intra-program type procedure call into an inter-execution environment type procedure call from the calling procedure in its corresponding execution environment to the called procedure in its corresponding execution environment, regardless of whether the execution environment for said first section is the same or different than the execution environment for said second section.

38. The system of claim 37, wherein said first section corresponds to a first execution environment, said second section corresponds to a second execution environment, and wherein said first execution environment is different from said second execution environment.

39. The system of claim 37, wherein said means for translating includes means for automatically inserting communications-type source code statements into said source code to facilitate said inter-execution environment type procedure call.

40. The system of claim 39, further comprising means for automatically inserting communications-type source code statements into the calling procedure and the called procedure which initialize variables used by the inter-execution environment type procedure call.

41. The system of claim 39, further comprising means for automatically inserting communication related source code statements into the called procedure which inform a communications subsystem of the execution environment of the called procedure.

42. The system of claim 37, wherein said source code comprises a plurality of sections, each section of said plurality of sections corresponding to an execution environment, and wherein said system further comprises means for automatically compiling each section of said plurality of sections for its corresponding execution environment.

* * * * *

UNITED STATES PATENT AND TRADEMARK OFFICE
CERTIFICATE OF CORRECTION

PATENT NO. : 5,774,728
DATED : June 30, 1998
INVENTOR(S) : Breslau et al.

It is certified that error appears in the above-identified patent and that said Letters Patent is hereby corrected as shown below:

Column 5, line 67, delete "target$_{13}$ name>" and replace with --target __name>--.

Signed and Sealed this

First Day of December, 1998

Attest:

BRUCE LEHMAN

*Attesting Officer*  *Commissioner of Patents and Trademarks*